(12) United States Patent
Sadek et al.

(10) Patent No.: US 7,376,632 B1
(45) Date of Patent: May 20, 2008

(54) MODEL AND METHOD FOR USING AN INTERACTIVE RATIONAL AGENT, MULTIAGENT SERVER AND SYSTEM IMPLEMENTING SAME

(75) Inventors: David Sadek, Perros-Guirec (FR); Philippe Bretier, Sulard (FR); Franck Panaget, Trebeurden (FR)

(73) Assignee: France Telecom, Paris (FR)

( * ) Notice: Subject to any disclaimer, the term of this patent is extended or adjusted under 35 U.S.C. 154(b) by 0 days.

(21) Appl. No.: 09/869,205

(22) PCT Filed: Dec. 21, 1999

(86) PCT No.: PCT/FR99/03242

§ 371 (c)(1),
(2), (4) Date: Sep. 17, 2001

(87) PCT Pub. No.: WO00/39672

PCT Pub. Date: Jul. 6, 2000

(30) Foreign Application Priority Data

Dec. 23, 1998 (FR) .................................. 98 16374

(51) Int. Cl.
*G06F 15/18* (2006.01)
(52) U.S. Cl. .................... 706/12; 704/200; 706/11; 709/202; 709/204
(58) Field of Classification Search .................. 706/12
See application file for complete search history.

(56) References Cited

U.S. PATENT DOCUMENTS

| | | | | |
|---|---|---|---|---|
| 5,819,243 A | * | 10/1998 | Rich et al. ..................... 706/11 |
| 5,913,040 A | * | 6/1999 | Rakavy et al. ............... 709/232 |
| 5,931,907 A | * | 8/1999 | Davies et al. ................ 709/218 |
| 5,974,412 A | * | 10/1999 | Hazlehurst et al. ............ 707/3 |
| 5,995,951 A | * | 11/1999 | Ferguson ..................... 706/10 |
| 5,999,182 A | * | 12/1999 | Etchemendy et al. ....... 715/853 |
| 6,076,082 A | * | 6/2000 | Kindo .......................... 706/12 |
| 6,108,640 A | * | 8/2000 | Slotznick ..................... 705/26 |
| 6,144,989 A | * | 11/2000 | Hodjat et al. ............... 709/202 |
| 6,278,993 B1 | * | 8/2001 | Kumar et al. .................. 707/3 |
| 6,289,337 B1 | * | 9/2001 | Davies et al. .................. 707/3 |
| 6,289,353 B1 | * | 9/2001 | Hazlehurst et al. ......... 707/102 |
| 6,304,861 B1 | * | 10/2001 | Ferguson ..................... 706/10 |
| 6,317,789 B1 | * | 11/2001 | Rakavy et al. .............. 709/224 |

(Continued)

OTHER PUBLICATIONS

David L. Martin, Adam J. Cheyer, Douglas B. Moran, Artificial Intelligence Center SRI International, The Open Agent Architecture: A Framework for Building Distributed Software Systems (Oct. 9, 1998).*

(Continued)

*Primary Examiner*—Michael B. Holmes
(74) *Attorney, Agent, or Firm*—Patterson, Thuente, Skaar & Christensen, P.A.

(57) ABSTRACT

A model and implementation process of a conversational rational agent as a kernel of a dialogue system and/or as an element (agent) of a multiagent system including definition of a conceptual architecture of a conversational rational agent; formal specification of the different components of this architecture and their combination permitting a formal model to be obtained; definition of the software architecture implementing the formal architecture; and definition of implementation mechanisms of the formal specifications, the rational agent being suited both to converse with another agent or with a user of the system through any communication medium.

18 Claims, 4 Drawing Sheets

U.S. PATENT DOCUMENTS

| | | | |
|---|---|---|---|
| 6,353,824 B1* | 3/2002 | Boguraev et al. | 707/5 |
| 6,539,429 B2* | 3/2003 | Rakavy et al. | 709/224 |
| 6,553,373 B2* | 4/2003 | Boguraev et al. | 707/5 |
| 6,594,684 B1* | 7/2003 | Hodjat et al. | 709/202 |
| 6,725,425 B1* | 4/2004 | Rajan et al. | 715/513 |
| 6,735,632 B1* | 5/2004 | Kiraly et al. | 709/229 |
| 6,772,190 B2* | 8/2004 | Hodjat et al. | 709/202 |
| 6,810,392 B1* | 10/2004 | Piggott | 706/12 |
| 6,820,093 B2* | 11/2004 | de la Huerga | 707/104.1 |
| 6,859,212 B2* | 2/2005 | Kumar et al. | 715/744 |
| 6,865,572 B2* | 3/2005 | Boguraev et al. | 707/5 |
| 7,006,881 B1* | 2/2006 | Hoffberg et al. | 700/83 |
| 7,062,500 B1* | 6/2006 | Hall et al. | 707/102 |
| 7,107,107 B2* | 9/2006 | Morikawa et al. | 700/31 |
| 7,107,281 B2* | 9/2006 | De La Huerga | 707/102 |
| 7,137,126 B1* | 11/2006 | Coffman et al. | 719/328 |
| 7,178,096 B2* | 2/2007 | Rangan et al. | 715/500 |
| 7,200,804 B1* | 4/2007 | Khavari et al. | 715/513 |
| 2006/0168335 A1* | 7/2006 | Hodjat et al. | 709/239 |

OTHER PUBLICATIONS

Natural communication with information systems Marsic, I.; Medl, A.; Flanagan, J.; Proceedings of the IEEE vol. 88, Issue 8, Aug. 2000 pp. 1354-1366 Digital Object Identifier 10.1109/5.880088 □□.*

An architecture for designing distributed spoken dialogue interfaces Allen, C.; Stoecklin, S.; Bobbie, P.; Qian Chen; Ping Wu; Tools with Artificial Intelligence, 1999. Proceedings. 11th IEEE International Conference on Nov. 9-11, 1999 pp. 245-252 Digital Object Identifier 10.1109/TAI.1999.809793.*

A BDI agent arcitecture for dialogue modelling and coordination in a smart personal assistant Wobcke, W.; Ho, V.; Nguyen, A.; Krzywicki, A.; Intelligent Agent Technology, IEEE/WIC/ACM International Conference on Sep. 19-22, 2005 pp. 323-329 Digital Object Identifier 10.1109/IAT.2005.3.*

A dialogue agent with adaptive and proactive capabilities Baudoin, F.; Bretier, P.; Corruble, V.; Intelligent Agent Technology, IEEE/WIC/ACM International Conference on Sep. 19-22, 2005 pp. 293-296 Digital Object Identifier 10.1109/IAT.2005.8.*

Extensibility and Reuse in an Agent-Based Dialogue Model Nguyen, A.; Wobeke, W.; Web Intelligence and International Agent Technology Workshops, 2006. WI-IAT 2006 Workshops. 2006 IEEE/WIC/ACM International Conference on Dec. 2006 pp. 367-371 Digital Object Identifier 10.1109/WI-IATW.2006.70.*

Dialogue-based human-robot interaction for space construction teams Jones, H.; Rock, S.; Aerospace Conference Proceedings, 2002. IEEE vol. 7, Mar. 9-16, 2002 pp. 7-3645-7-3653 vol. 7 Digital Object Identifier 10.1109/AERO.2002.1035340.*

A multi-purpose dialogue management system employing visual anthropomorphous agent Mori, M.; Dohi, H.; Ishizuka, M.; Robot and Human Communication, 1995. RO-MAN'95 TOKYO, Proceedings., 4th IEEE International Workshop on Jul. 5-7, 1995 pp. 187-192 Digital Object Identifier 10.1109/ROMAN.1995.531958.*

Designing Web-based adaptive support for debate with dialogue modelling Cook, J.; Advanced Learning Technologies, 2000. IWALT 2000. Proceedings. International Workshop on Dec. 4-6, 2000 pp. 15-16 Digital Object Identifier 10.1109/IWALT.2000.890553.*

Man and machine bidirectional communication interface using voice and pointing action Watanabe, Y.; Sugiyama, S.; Tanaka, K.; Yagi, T.; Nishimura, K.; Abe, N.; Taki, H.; Cybernetics and Intelligent Systems, 2004 IEEE Conference on vol. 2, 2004 pp. 970-975 Digital Object Identifier 10.1109/ICCIS.2004.1460720.*

Multi modal user interaction in an automatic pool trainer Larsen, L.B.; Jensen, M.D.; Vodzi, W.K.; Multimodal Interfaces, 2002. Proceedings. Fourth IEEE International Conference on Oct. 14-16, 2002 pp. 361-366 Digital Object Identifier 10.1109/ICMI.2002.1167022.*

Layered modular action control for communicative humanoids Thorisson, K.R.; Computer Animation '97 Jun. 5-6, 1997 pp. 134-143 Digital Object Identifier 10.1109/CA.1997.601055.*

Automated support for human mixed initiative decision and control Penner, R.R.; Steinmetz, E.S.; Decision and Control, 2003. Proceedings. 42nd IEEE Conference on vol. 4, Dec. 9-12, 2003 pp. 3549-3554 vol. 4 Digital Object Identifier 10.1109/CDC.2003.1271698.*

A visual anthropomorphic agent with learning capability of cooperative answering strategy through speech dialog Takama, Y.; Dohi, H.; Ishizuka, M.; Computer Human Interaction, 1998. Proceedings. 3rd Asia Pacific Jul. 15-17, 1998 pp. 260-265 Digital Object identifier 10.1109/APCHI.1998.704331.*

A personalized restaurant recommender agent for mobile e-service Hung-Wen Tung; Von-Wun Soo; e-Technology, e-Commerce and e-Service, 2004. EEE '04. 2004 IEEE International Conference on Mar. 28-31, 2004 pp. 259-262 Digital Object Identifier 10.1109/EEE.2004.1287319.*

Dynamic multi-agent architecture for multimedia multimodal dialogs Djenidi, H.; Tadj, C.; Ramdane-Cherif, A.; Levy, N.; Knowledge Media Networking, 2002. Proceedings. IEEE Workshop on Jul. 10-12, 2002 pp. 107-113 Digital Object Identifier 10.1109/KMN.2002.1115171.*

Active: A Unified Platform for Building Intelligent Web Interaction Assistants Guzzoni, D.; Baur, C.; Cheyer, A.; Web Intelligence and International Agent Technology Workshops, 2006. WI-IAT 2006 Workshops. 2006 IEEE/WIC/ACM International Conference on Dec. 2006 pp. 417-420 Digital Object Identifier 10.1109/WI-IATW.2006.27.*

Acquiring and transferring intellectual skills with modifiable software advisors in a virtual inquiry support environment Shimoda, T.A.; White, B.Y.; Frederiksen, J.R.; System Sciences, 1999. HICSS-32. Proceedings of the 32nd Annual Hawaii International Conference on Volume Track1, Jan. 5-8, 1999 pp. 10 pp.*

Adapting computer-human interaction in real time Frutos, S.; Gonzalez, A.L.; Martinez, L.; Montes, C.; Systems, Man, and Cybernetics, 1998. 1998 IEEE International Conference on vol. 1, Oct. 11-14, 1998 pp. 1038-1043 vol. 1 Digital Object Identifier 10.1109/ICSMC.1998.725554.*

Mixed-initiative interaction Allen, J.E.; Guinn, C.I.; Horvtz, E.; Intelligent Systems and Their Applications, IEEE [see also IEEE Intelligent Systems] vol. 14, Issue 5, Sep.-Oct. 1999 pp. 14-23 Digital Object Identifier 10.1109/5254.796083.*

Defeasible Protocols in Persuasion Dialogues Letia, I.A.; Vartic, R.; Web Intelligence and International Agent Technology Workshops, 2006. WI-IAT 2006 Workshops. 2006 IEEE/WIC/ACM International Conference on Dec. 2006 pp. 359-362 Digital Object Identifier 10.1109/WI-IATW.2006.56.*

Esigning automated help using searcher system dialogues Jansen, B.J.; Systems, Man and Cybernetics, 2003. IEEE International Conference on vol. 1, Oct. 5-8, 2003 pp. 744-749 vol. 1 Digital Object Identifier 10.1109/ICSMC.2003.1243903.*

Maintaining credible dialogs in a VideoBot system with special audio techniques DeGroot, D.; Tools with Artificial Intelligence, Proceedings of the 13th International Conference on Nov. 7-9, 2001 pp. 351-358 Digital Object Identifier 10.1109/ICTAI.2001.974483.*

Agent and user inhabited virtual communities: a case study Nijholt, A.; Knowledge-Based Intelligent Engineering Systems and Allied Technologies, 2000. Proceedings. Fourth International Conference on vol. 1, Aug. 30-Sep. 1, 2000 pp. 337-340 vol. 1 Digital Object Identifier 10.1109/KES.2000.885825.*

Effective human-computer cooperative spoken dialogue: the AGS demonstrator Sadek, M.D.; Ferrieux, A.; Cozannet, A.; Bretier, P.; Panaget, F.; Simonin, J.; Spoken Language, 1996. ICSLP 96. Proceedings., Fourth International Conference on vol. 1, Oct. 3-6, 1996 pp. 546-549 vol. 1 Digital Object Identifier 10.1109/ICSLP.1996.607175.*

Q: a scenario description language for interactive agents Ishida, T.; Computer vol. 35, Issue 11, Nov. 2002 pp. 42-47 Digital Object Identifier 10.1109/MC.2002.1046973.*

Crafting the illusion of meaning: template-based specification of embodied conversational behavior Stone, M.; DeCarlo, D.; Computer Animation and Social Agents, 2003. 16th International Conference on May 8-9, 2003 pp. 11-16 Digital Object Identifier 10.1109/CASA.2003.1199298.*

Ontology-based Knowledge in Interactive Maintenance Guide Nyrkko, S.; Carlson, L.; Keijola, M.; Ahonen-Myka, H.; Niemi, J.; Piitulainen, J.; Viitanen, S.; Meri, M.; Seitsonen, L.; Mannonen, P.; Juvonen, J.; System Sciences, 2007. HICSS 2007. 40th Annual Hawaii International Conference on Jan. 2007 pp. 47-47.*

Intelligent technology for distributed design and monitoring of information system Awdoshin, J.G.; Bereznyatsky, A.V.; Science and Technology, 2001. KORUS '01. Proceedings. The Fifth Russian-Korean International Symposium on vol. 1, Jun. 26-Jul. 3, 2001 pp. 108-110 vol. 1 Digital Object Identifier 10.1109/KORUS.2001. 975070.*

Agent-based support for public information kiosks Mamdani, E.H.; Charlton, P.M.; Intelligent Agents and Their Applications, IEEE Colloquium on (Digest No. 1996/101) Apr. 30, 1996 pp. 4/1-4/3.*

Mitchell et al., *Structuring Formal Specifications-A Lesson Relearned*, IEEE, Nov. 1990, pp. 202-208.

Leavitt et al., *The DIBBS Blackboard Control Architecture and Its Application to Distributed Natural Language Processing*, IEEE, Nov. 1990, pp. 202-208.

Depaoli et al., *Development of a Collaborative Application in CSDL*, IEEE, May 1993, pp. 210-217.

Wong, *Preference-Based Decision Making for Cooperative Knowledge-Based Systems*, ACM Transactions on Information Systems, vol. 12, No. 4, Oct. 1994, pp. 407-435.

Sadek et al., *Effective Human-Computer Cooperative Spoken Dialogue: The AGS Demonstrator*, Proceedings ICSLP 96, Oct. 1996, pp. 546-549.

D. Sadek. Dialogue acts are rational plans. Proceedings ESCA Tutorial and Research Workshop on the Structures of Multimodal Dialogue, Maratea, Italy, 1991.

Sadek, M.D. A study in the logic of intention. Proceedings of the 3rd Conference on Principles of Knowledge Representation and Reasoning (KR'92), pp. 462-473, Cambridge, MA, 1992.

Sadek, M.D. [translated from French] Foundations of dialogue: Rational interaction. Proceedings of the 4th summer school on Natural Language Processing, pp. 229-255, Lannion, France, 1993.

Sadek, M.D. [translated from French] Mental attitudes and foundation of cooperative behavior. Pavard, B., editor, Cooperative systems: of modeling the design, Octares Eds., pp. 93-117, 1994.

Sadek, M.D. Communication theory=rationality principles+communicative act models. Proceedings of the AAI'94 Workshop on planning for Interagent Communication, Seattle, WA, 1994.

Sadek, M.D. Towards a theory of belief reconstruction: Application to communication. In (SPECOM94): 251-263.

Sadek, M.D., Ferrieux, A., & Cozannet, A. Towards an artificial agent as the kernel of a spoken dialogue system: A progress report. Proceedings of the AAI'94 Workshop on Integration of Natural Language and Speech Processing, Seattle, WA, 1994.

D. Sadek, P. Bretier, V. Cadoret, A. Cozannet, P. Dupont, A. Ferrieux, & F. Panaget: A cooperative spoken dialogue system based on a rational agent model: A first implementation on the AGS application. Proceedings of the ESCA Tutorial and Research Workshop on Spoken Language Systems, Hanstholm, Denmark, 1995.

M.D. Sadek, P. Bretier, & F. Panaget. ARTIMIS: Natural Dialogue Meets Rational Agency. Proceedings 15th International Joint Conference on Artificial Intelligence (IJCAI'97), Nagoya, Japan, pp. 1030-1035, 1997.

Sadek, M.D. [translated from French] Mental attitudes and rational interaction: Toward a formal theory of communication. Computer Doctorate thesis, University of Rennes I, France, 1991.

P. Bretier, F. Panaget, & D. Sadek. Integrating linguistic capabilities into the formal model of a rational agent: Application to cooperative spoken dialogue. Proceedings of the AAAI'95 Fall Symposium on Rational Agency, Cambridge, MA, 1995.

P. Bretier & D. Sadek. Designing and implementing a theory of rational interaction to be the kernel of a cooperative spoken dialogue system. Proceedings of the AAAI'95 Fall Symposium on Rational Agency, Cambridge, MA, 1995.

P. Bretier. [translated from French] The cooperative oral communication: Contribution to the logical modeling and implementation of a conversational rational agent. Computer Science Doctoral Thesis, University of Paris XIII, 1995.

Bretier, P. and M.D. Sadek. A rational agent as a kernel of a cooperative dialogue system: Implementing a logical theory of interaction. ECAI'96 Workshop on Agent Theories, Architectures, and Languages, Budapest, Hungary, pp. 189-203, 1997.

Sadek, M.D., Ferrieux A., Cozannet A., Bretier P., Panaget F., & Simonin J. Effective human-computer cooperative spoken dialogues: The AGS demonstrator. In (ISSD 96) (and also Proceedings ICSLP'96 of, Philadelphia, 1996).

Conseil Scientifique de France Telecom, Technical Memo No. 8: Smart Interfaces and Images, Oct. 1996, p. 37-61.

* cited by examiner

MODEL AND METHOD FOR USING AN INTERACTIVE RATIONAL AGENT, MULTIAGENT SERVER AND SYSTEM IMPLEMENTING SAME

BACKGROUND OF THE INVENTION

1. Field of the Invention

The invention concerns a model and an implementation process for a conversational rational agent as kernel of a dialogue system or a multiagent system.

The invention applies not only to human/agent interaction systems (man/machine dialogue) but also to agent/agent interaction systems (interagent communication and cooperation).

It applies to information servers.

Although the design of man/machine dialogue systems has been studied seriously for more than thirty years, few systems foreshadowing actual usage are available today.

Most demonstration systems that were developed showed at best the system capacity to concatenate some simple exchanges with a user into a stereotyped structure (configured to a particular task) and to a restricted application framework.

These systems are generally limited to illustrating such and such characteristic of an evolved interaction, such as, for example, the machine's understanding of a more or less complex statement (contextual in oral or written natural language, possibly combined with other communication media) or in certain rather restricted cases to the production of a cooperative response.

These systems are still rather far removed from meeting all the conditions required for natural usage of said systems as the convivial conversing "partners" even in the framework of rather ordinary application.

The reasons for this situation are two fold. On the one hand the design of dialogue systems is a complex undertaking because it accrues the problems related to the design of smart artificial systems and those related to the modeling and the formalization of natural communication. When oral dialogue is of interest, the problems linked to the automatic speech recognition are added to this difficulty.

On the other hand, a lot of works have approached dialogue as an isolated phenomenon that deals with the identification of the external manifestations so that an automatic system may learn them. These works have (either deliberately or not) been completely (or partially) sparse regarding the link between the problems of dialogue and that of system intelligence and therefore a formal in-depth study of the cognitive foundations of dialogue.

We are now going to cover briefly the classical approaches of the dialogue that have been developed up until now.

First, there are the structural approaches that come from either the computer field or the linguistic field. They are interested in the determination of an interaction structure that takes into account the regularities in a dialogue exchange (where the simplest are the adjacent pairs such the questions/answers, suggestions/acceptances).

These approaches form the hypothesis that this structure exists and that it may be represented in a finite fashion and that all dialogues or at least a large part among them can be circumscribed therein. Structural approaches consider that the coherency of a dialogue is intrinsic to its structure and thus concentrate on the co-text (the accompanying text) while more or less directly glossing over the profoundly contextual nature of the communication. These limitations are an irrevocable handicap for any interest in the structural approach as a basis for smart interaction models.

There are also the classic differential approaches.

These approaches, also called guided plans, consider intervention in a communication situation not only as a collection of signals (for example, a word sequence) but also as the observable enactment of communicative action (also called according to context, language or dialogue acts) such as to inform, ask, confirm, commit.

These approaches allow us to have an idea of a powerful potential for the study of communication and specifically cooperative dialogue. However, they rely upon short cuts (that causes them to call upon empirical or structural complements that make them lack robustness) and also upon knowledge usage representations that unfortunately often lead to aberrations.

This filer developed a new approach relying upon rational interaction or the conversational rational agent.

In this new approach this filer tried first to maximize the conviviality of interactions between the users and the automatic services.

2. Description of the Related Art

The following publications on the topic may be referred to:

Sadek 91a: Sadek, M.D. [translated from French] Mental attitudes and rational interaction: Toward a formal theory of communication. Computer Doctorate thesis, University of Rennes I, France, 1991.

Sadek 91b: D. Sadek. Dialogue acts are rational plans. Proceedings ESCA Tutorial and Research Workshop on the Structures of Multimodal Dialogue, Maratea, Italy, 1991.

Sadek 92: Sadek, M.D. A study in the logic of intention. Proceedings of the 3rd Conference on Principles of Knowledge Representation and Reasoning (KR'92), pages 462-473, Cambridge, Mass., 1992.

Sadek 93: Sadek, M.D. [translated from French] Foundations of dialogue: Rational interaction. Proceedings of the 4th summer school on Natural Language Processing, pages 229-255, Lannion, France, 1993.

Sadek 94a: Sadek, M.D. [translated from French] Mental attitudes and foundation of cooperative behavior. Pavard, B., editor, Cooperative systems: of modeling the design, Octares Eds., pages 93-117, 1994.

Sadek 94b: Sadek, M.D. Communication theory rationality principles +communicative act models. Proceedings of the AAI '94 Workshop on planning for Interagent Communication, Seattle, Wash., 1994.

Sadek 94c: Sadek, M.D. Towards a theory of belief reconstruction: Application to communication. In (SPECOM94): 251-263.

Sadek et al 94: Sadek, M.D., Ferrieux, A., & Cozannet, A. Towards an artificial agent as the kernel of a spoken dialogue system: A progress report.

Proceedings of the AAI '94 Workshop on Integration of Natural Language and Speech Processing, Seattle, Wash., 1994.

Sadek et al 95: D. Sadek, P. Bretier, V. Cadoret, A. Cozannet, P. Dupont, A. Ferrieux, & F. Panaget: A cooperative spoken dialogue system based on a rational agent model: A first implementation on the AGS application. Proceedings of the ESCA Tutorial and Research Workshop on Spoken Language Systems, Hanstholm, Denmark, 1995.

Sadek et al 96a: Sadek, M.D., Ferrieux A., Cozannet A., Bretier P., Panaget F., & Simonin J. Effective human-computer cooperative spoken dialogues: The AGS demonstrator. In (ISSD 96) (and also Proceedings ICSLP'96 of, Philadelphia, 1996).

Sadek et al 97: M.D. Sadek, P. Bretier, & F. Panaget. ARTIMIS: Natural Dialogue Meets Rational Agency. Proceedings 15th International Joint Conference on Artificial Intelligence (IJCAI'97), Nagoya, Japan, pp. 1030-1035, 1997.

Bretier 95: P. Bretier. [translated from French] The cooperative oral communication: Contribution to the logical modeling and implementation of a conversational rational agent. Computer Science Doctoral Thesis, University of Paris XIII, 1995.

Bretier and al 95: P. Bretier, F. Panaget, & D. Sadek. Integrating linguistic capabilities into the formal model of a rational agent: Application to cooperative spoken dialogue. Proceedings of the AAAI'95 Fall Symposium on Rational Agency, Cambridge, Mass., 1995

Bretier & Sadek 95: P. Bretier & D. Sadek. Designing and implementing a theory of rational interaction to be the kernel of a cooperative spoken dialogue system. Proceedings of the AAAI '95 Fall Symposium on Rational Agency, Cambridge, Mass., 1995.

The conviviality of interaction arises among other attributes by the system's capacity to negotiate with the user, by its capacity to evaluate requests by taking into account the context, by its capacity to determine the implied intentions of the user and to conduct with him/her a flexible interaction that does not follow one preconceived plan for all occasions.

Such a system must be also capable of providing the user with solutions for which he/she has not explicitly asked but which are nevertheless applicable.

There does not exist at the present time a true smart dialogue system in service for an actual application due to the complexity of each of these tasks and because of the difficulty of gathering together all these features so that the interaction can really be qualified as convivial.

The technology developed by the filer rests on the basic principle, which is: in order for an automatic system to promote smart dialogues properly, this system cannot be simulated by a robot.

More precisely, the conviviality of the dialogue cannot be designed simply as window dressing of a preexisting system: on the contrary, this conviviality must arise naturally from the system's intelligence.

OBJECTS AND SUMMARY OF THE INVENTION

The object of the present invention is the realization of a software agent that is rational by its construction. The addition of appropriate principles renders it both communicative and cooperative.

In addition, the technology developed by the filer equally permits the implementation of a conversational rational agent as a kernel of a dialogue system as well as agent of a multiagent system.

In this second application (multiagent system), the communication between such agents no longer takes place by using natural language but rather a formal language (logical) adapted to interaction capacities of said agents.

The invention more specifically has as its object a model and an implementation process of a conversational rational agent as a kernel of a dialogue system or a multiagent system.

According to the invention, the implementation process of a conversational rational agent as kernel of a dialogue system and/or as an element (agent) of a multiagent system comprises the following stages:

definition of a conceptual architecture of a conversational rational agent, formal specification of the different components of this architecture and their combination allowing a formal model to be obtained, and which is characterized also in that it also includes the stages:

definition of a software architecture implementing the formal architecture, definition of implementation mechanisms of the formal specification, where the rational agent is thus capable of conversing with another agent or with a system user through any communications media (vocal or written: computer screen, keyboard, mouse, etc.).

The different components of the formal model are unified in the same formal framework (logical theory) with the same formalism. The generic nature of the mechanisms and principles gives the model a degree of independence with regard to the application, the communications media and the language.

The definition of implementation mechanisms is realized so as to obtain a direct correspondence between these mechanisms and the aforesaid model.

The formal specification of the different components of the formal architecture and their combination implies a level of rationality axioms, a level of communication axioms, and a level of cooperation axioms.

The definition of the software architecture implementing the formal architecture includes: a rational unit including an implementation layer of the rationality axioms level, an implementation layer of the communication axioms level, an implementation layer of the cooperation axioms level, corresponding respectively to axioms of the formal model.

The software definition implementing the formal architecture includes besides:

generation module and comprehension module implementing a natural language level layer.

The rational unit, the generation module, and the comprehension module implement the implementation mechanism of the formal model.

The generation module is suitable to transcribe a logical statement produced by the rational unit in natural language for system usage.

The comprehension module is suitable for interpreting the user's statement into a logical statement comprehensible to the rational unit.

The invention also has as its object a conversational rational agent placed as a kernel of a dialogue system, and/or as element (agent) of a multiagent system, including:

a definition of a conceptual architecture, a formal specification of the different components of this architecture and their combination permitting a formal model to be obtained, mainly characterized in that it includes:

a definition of a software architecture implementing the formal architecture, a definition of implementation mechanisms of the formal specification realized by a rational unit that comprises:

data including predefined axiom schemes and application-dependent axiom schemes, an application-dependent knowledge base including a semantic network and interconcept distances, an inference engine to implement formal specification mechanisms by means of data and the knowledge base so as to be able to receive a logical statement, understand it, and be able to provide a logical statement in response, According to another characteristic, the data include implementation data of a formal model including:

an implementation layer of rationality axioms, an implementation layer of communication axioms, and an implementation layer of cooperation axioms, corresponding respectively to the axioms of the formal model.

According to another characteristic the agent includes besides:

a statement generation module in natural language using a logical statement coming from the rational unit and a comprehension module to provide a logical language statement to the rational unit from a natural language statement; these modules thus implement a communication level layer in natural language.

The invention also has as its object an information server, including the means to implement a man-machine dialogue system the kernel of which rests on the implementation of a conversational rational agent as previously defined.

The invention also concerns a multiagent system including the communicating agents, each agent including the means to implement an interaction, the system including at least one agent the kernel of which rests on an implementation of a conversational rational agent as described previously.

BRIEF DESCRIPTION OF THE DRAWINGS

Other specifics and advantages of the invention will appear clearly to the reader from the description made below by way of non-restrictive examples and regarding the figures of which.

DESCRIPTION OF THE PREFERRED EMBODIMENTS

The conversational rational agent approach that has been executed by the filer and that has been the object of publications, has been guided by principles of rationality, communication and cooperation, formalized in the theory of the rational interaction. For this purpose you may refer to the previously mentioned publications that pertain to the "conversational rational agent" approach.

The definition of the conceptual architecture of a conversational rational agent is given in the appendix of the description. This definition was the object of a publication in "Conseil Scientifique de France Télécom" (French Telecom Scientific Council), Technical Memo no. 8: Smart Interfaces and Images" October 1996, pp. 37-61.

Figure 1:
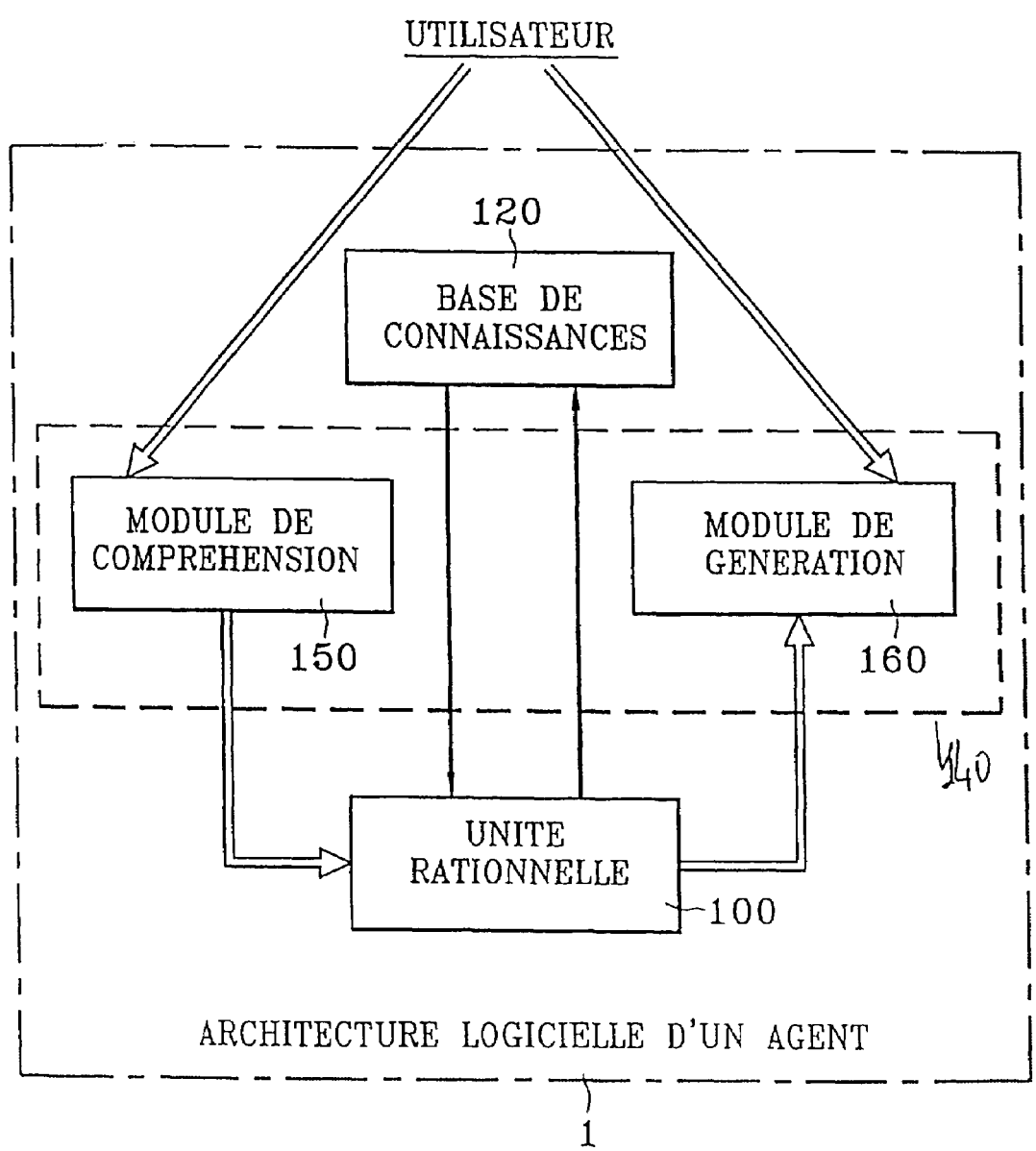
FIG. 1 represents the software architecture of a conversational rational agent.

For the following you may refer to the diagram of FIG. 1.

According to the invention, the filer has implemented these principles by means of a rational unit 100 that constitutes the kernel of each agent which determines its reactions to external events, whether these are prompts (requests, answers, confirmations etc) from human users or prompts from other software agents (which is the case when an agent is the kernel of a multiagent system).

The rational unit 100 is driven by a inference engine that automates reasoning according to the rational interaction principles that the agent's programmer can adapt or enrich, in a declarative manner, according to the task to accomplish.

For this purpose, as will be specified below, these reasoning processes are guided by predetermined axiom schemes (enumerated in appendices) input to the unit by the agent's programmer in a declarative manner as a function of the tasks that said agent must fulfill.

FIG. 1 illustrates an agent's software architecture diagram in the case where such an architecture is applied to the constitution of a dialogue system with the users.

FIG. 1 therefore represents architecture of an agent in interaction with a user, through as will be seen, a comprehension module 150 and a generation module 160. This architecture corresponds to a first possible application family that is the (convivial) interaction user service.

In order to permit dialogue with the users, the rational unit 100 is connected to an interface to the outside 140.

This interface thus includes the comprehension module 150 that receives statements in natural language and interprets these statements in a logical statement that acts as input to the rational unit 100.

The interface also includes the generation module 160 that expresses the reaction of the rational unit 100 in a natural language statement sent to the user.

In this framework, the rational unit 100 is the central entity of the service to render whatever information is required (train timetables, stock exchange trends, weather reports . . . ) reservations or purchases or the look-up of information on the Internet.

The cooperation principles installed in the rational unit and natural language processing modules assure a convivial interaction with the user. This interaction can take place directly by speech by incorporating the dialogue system thus formed by the speech recognition and synthesis modules (not represented in this figure).

However, the rational unit 100 can by itself constitute the kernel of a self-contained software agent. In this framework, this unit interacts with other software agents by means of an inter-agent communications language such as the "Agent Communication Language" (A.C.L. adopted as a standard by the FIPA consortium).

The services that the agent can render are then for example transactions on the electronic markets, network administration tasks, broadcasting information.

These two forms of interaction can be combined in such a way that after the interaction in natural language with an user, an agent fulfills any task whatsoever by interactions in ACL language with other software agents distributed on the public or private networks.

Figure 2:
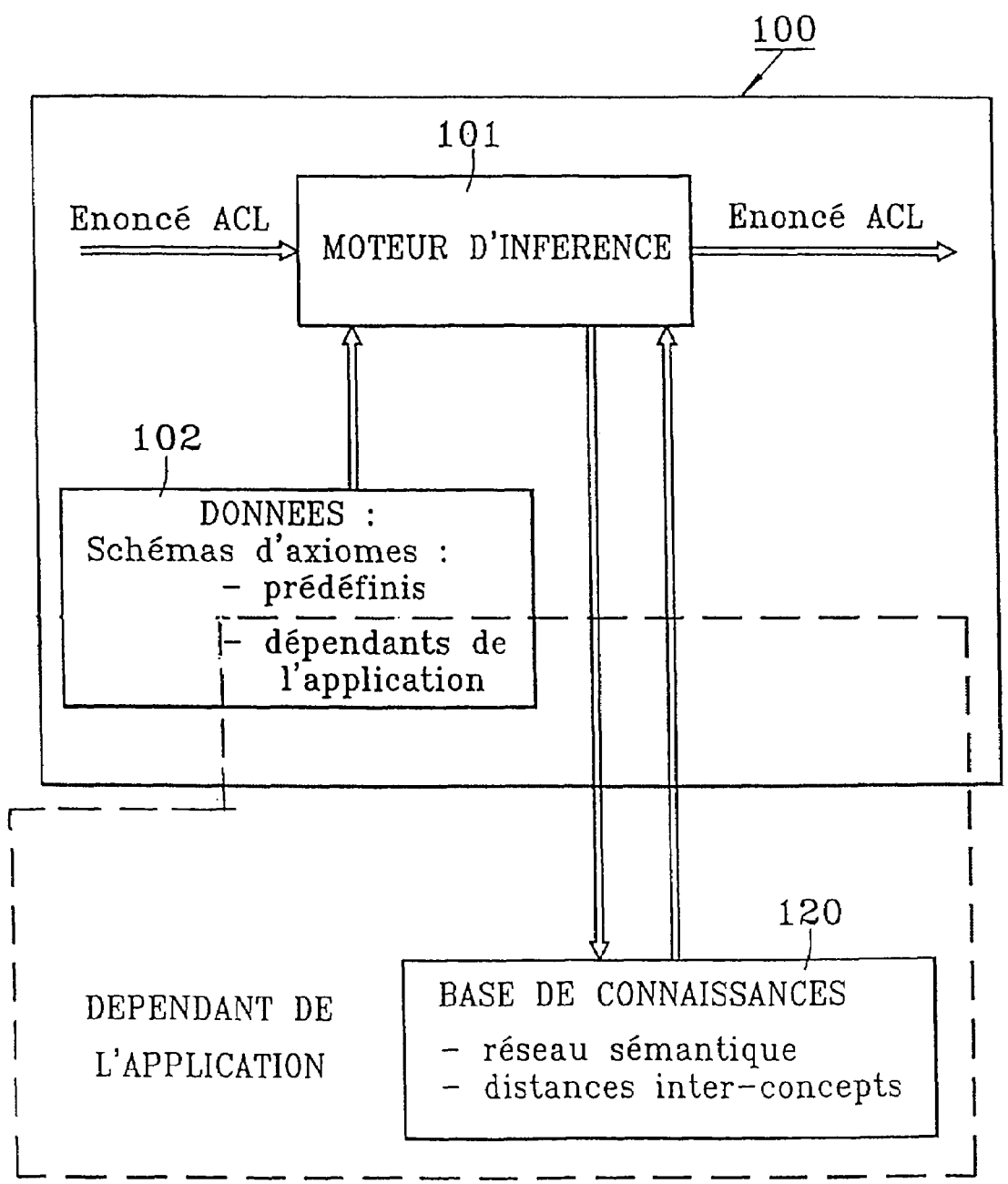
FIG. 2 represents the architecture of the rational unit and its knowledge base.

We are now going to detail the software architecture functionalities of the rational unit 100, this detailed architecture been illustrated by the diagram FIG. 2.

First of all, the rational unit 100 implements the principles coming from rational interaction theory the objective of which is to formalize and automate the rational behavior of an agent in interaction situations with other agents or service users.

This theory depends on two major notions the notion of modal logic on the one hand, where the objective is to allow the mental attitudes of self-contained agents to be represented and, the notion of language acts on the other hand, where the objective is to specify the effects of communication on the mental attitudes of agents.

The contribution of the theory of rational interaction is to formalize these two domains and in particular their interaction.

An agent's state at any given time in a communicating exchange is thus characterized by a set of mental attitudes.

The mental attitudes that may be represented are for example the belief usually noted by the operator K and the intention noted by the operator I.

These operators are indexed by the agent whose mental attitude they represent.

In a dialogue with the system s and the user u, Ks designates the belief operator for the system and Ku the same operator for the user.

Language acts that may be modeled are among others, the information and request acts. The modeling consists of a logical statement or logical language, for example:

Ks Iu Done (<s, Inform Si(u,p)>)

This logical statement is translated as follows:

the system s knows (operator K) that the user u has the intention (operator I) that a certain communicative act is to be performed, that is s informs u whether a certain proposition p is true or false, or in shorter form: "s knows that u wishes s to report to him/her on the truthfulness of p."

The logical language thus defined permits expressing general principles of behavior that will determine the reactions of the rational unit.

An agent s will be cooperative if it adopts the intentions of the user u. This can be expressed thus:

Ks Iu φ+Is φ

Such axiom schemes on a very general scale are already predefined by the theory of the interaction and form part of an agent's rational unit.

However, the programmer of the rational unit can define new, more specialized, schemes for a given application.

The set of schemes guide the reasoning of rational unit 100 and therefore its reactions to prompts from the environment.

The calculation of these reactions is made by the inference engine 101.

The rational unit 100 therefore include a data set 102 that includes the axiom of the formal model of the conversational rational agent. This data implements the rationality layers of the agent's communication and cooperation.

Environmental prompts, for example users requests, or those from other software agents are transmitted to the rational unit 100 in the form of a ACL logical statement from the theory of rational interaction.

The inference engine 101 is suitable for calculating the consequences of this statement and in particular possible responses or precise requests to be provided to the interlocutor (which may act as a software agent or a human user) but also for other non-communicative actions.

Specifically for a given statement, the inference engine 101 examines whether or not it has a behavior principle available that it can apply to this statement to deduce its logical consequence or consequences. This procedure is then applied to these new consequences until the possibilities are exhausted.

From among all these consequences, the inference engine 101 isolates communication or other actions that it must perform and that then form the reaction of the rational agent.

The first stage of the inference procedure is placing the processed statements in normal form so as to assure that each statement is only introduced in one given syntactic form so as to be able to assure the sorting and the comparison of statements.

This placement in normal form permits equally ensuring a first application of the simple principles of reasoning.

The inference procedure for each statement processed then consists of verifying whether this statement corresponds to one of the axiom schemes 102 that code for the rational behavior principles retained.

This verification mechanism rests mainly on the unification operation of the Prolog language.

The set of these axiom schemes can be modified by the programmer of the rational unit 101 who may delete or add axiom schemes or alternatively modify those already existing to fine tune the rational unit's behavior.

These modifications can take place dynamically. In this case the rational unit modifies its behavior accordingly.

The inference procedure set is controlled so that the rational unit does not enter in an infinite reasoning loop. The termination of this procedure is thus assured.

The reasoning of the rational unit thus takes its support from a data set that depends heavily on the application sought by the rational agent.

When an agent is desired to provide train timetables, it must have available the data on stations and the connections between them as well as the temporal notions.

The data set is structured in a knowledge base 120 in the form of a semantic network.

The semantic network 120 permits expressing notions of classes and subclasses, and instantiation of each class. It also defines the notion of relation between classes that applies to the different instances of classes.

For example, for an appointment type of application, the semantic network 120 will include at least the classes "nobody" (whose instance will be the set of known people in the appointment schedule) and "function" (whose instances will be the known functions).

These two classes are in the "the-function-of" relation.

To indicate that the person Jean is in Advertising, the semantic network includes the Prolog fact: the-function-of (Jean, Advertising agent).

An access to the semantic network 120 is realized at any times during the inference procedure when the consequences of the inference depend on the kind of data.

In the appointment application, for example, if the user asks what is Jean's profession, the response of the rational agent is going to depend on its querying the semantic network 120.

The semantic network 120 can also have notions of semantic environment that are partially useful to produce cooperative responses of the rational agent.

It consists in assigning relative distances to the different processes of the semantic network, these distances are determined according to the application at the time of the creation of the semantic network.

The instances of the semantic network 120 are thus projected in a metric space where its dimensions are the different network relations.

For example, the advertising function will probably be determined semantically as closer to the function marketing engineer than mechanic.

This construction permits us to perform two symmetrical operations called constraint relaxation and restriction.

The relaxation of constraints aims to give some answers close to the initial request when the answer to the latter does not exist.

So, for example, one asks the appointment schedule who the marketing engineers are and [is answered] that none exist, the inference procedure can trigger a relaxation stage so as to give the coordinates of advertising agents.

The restriction, aims on the other hand to seek how to specify a request more precisely that is too general (broad). If there are 500 advertising agents recorded in the appointment schedule, a restriction stage will give the most discriminate dimension of this too broad a set (for example the company or work of the advertising agent) in order to be able to ask a pertinent question so as to identify the user's request.

FIG. 2 also permits illustrating that the rational unit 100 of a rational agent include both a generic part independent of the application and an application dependent part.

The inputs and outputs of the rational unit 100 can be considered as statements in ACL. The conversion under normal form of these statements and the inference procedure are independent of the application as well as a majority of axiom schemes that guide the system behavior. However some among them are especially adapted or created for the application as well as the semantic network that contains application data. The network 120 must, most the time, be able to respond to restriction and/or relaxation requests by the inference engine 101 as may be seen in more detail hereunder.

In this case the network must, have notions available of semantic distance between the instances as was stated.

Figure 3:
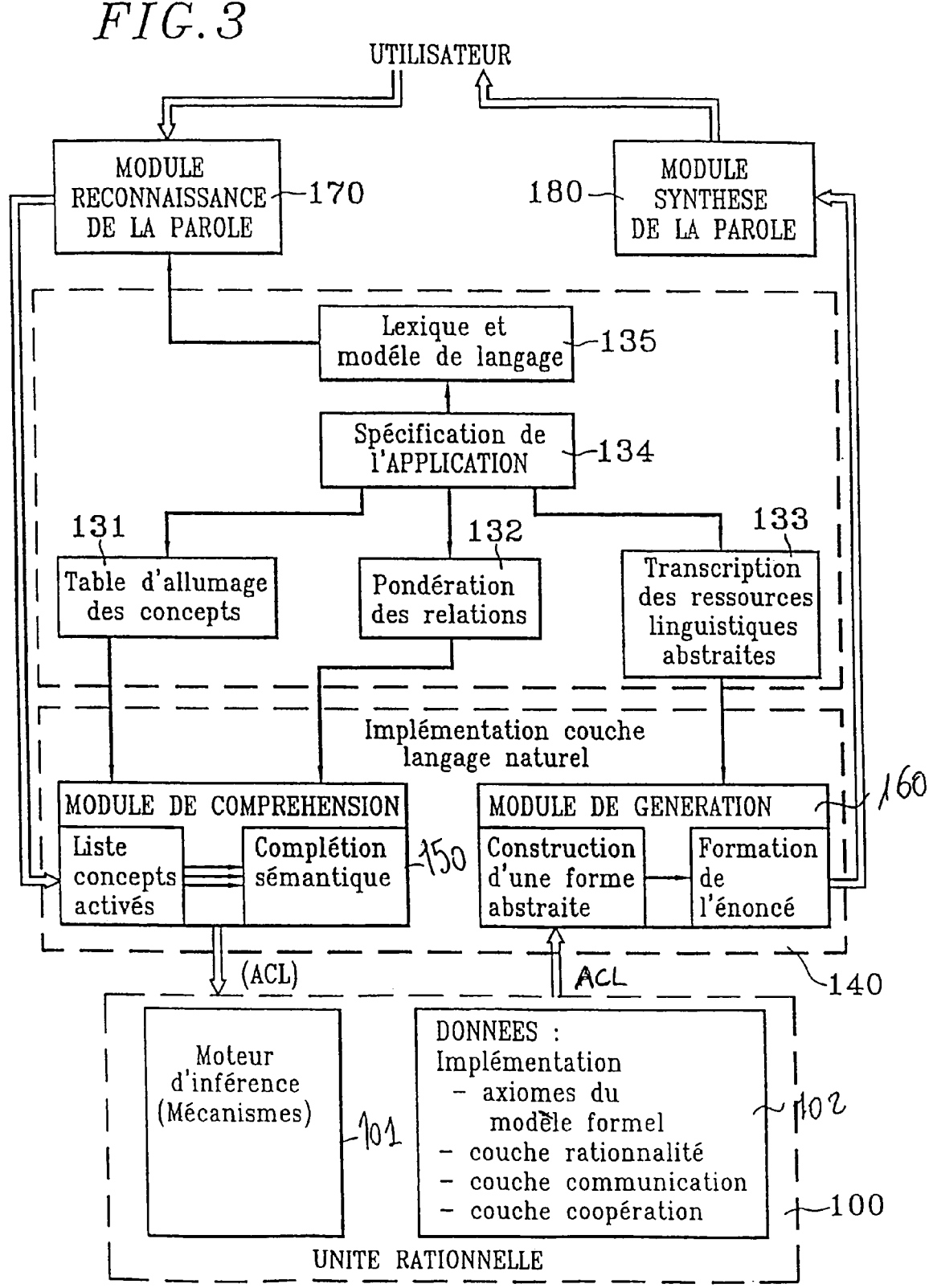
FIG. 3 represents in a more detailed manner the software architecture of a conversational agent as a kernel of a dialogue system (specifically oral)

The diagram FIG. 3 illustrates in more detail an agent's software architecture according to the invention.

The comprehension module of the natural language 150 interprets a user's statement into a logical statement comprehensible by the rational unit 100.

The vocabulary processed by this module depends in part on the service the rational agent must render. This dependent part of the application is mainly present in the semantic network 120 of the rational unit, which explains that the comprehension module 150 uses numerous data coming from the semantic network 120.

The comprehension module 150 is suitable to take the user's statement into account as a suite of small syntactic structures (most often words) that will each activate one or several (in the cases of synonyms) notion(s) coming from the semantic network 120.

The link between the input vocabulary of the user and the semantic network 120 is done therefore by means of a concept activation table 131 that indicates what semantic notion(s) correspond to words (or suite of words) of the vocabulary.

These activated notions depend in part on the desired application, but represent also much more general concepts such as negation, intention and user's knowledge, existence, cardinalities, etc.

The comprehension module therefore has available an activated concept list (indeed several in the case of synonyms).

It is suited to transform them into a logical statement formed by a semantic completion procedure. This procedure starts from the hypothesis of semantic connectivity of the user's statement, that is to say the concepts that it has evoked are in relationship to one another.

The module 150 is suitable for connecting between them, by the relationships present in the semantic network, including therein if necessary the creation of new concepts.

The procedure determines notions implied in the user's statement.

It is possible to indicate that some relationships in the user's statement are incompatible with one another. The search possibilities of the completion procedure are thus controlled.

The semantic completion resorts to a weighting function 132 that permits fixing a digital weight for every relationship of the semantic network, thereby representing the verisimilitude of vocations by this relationship.

In this manner, the completion procedure takes in account a notion of verisimilitude when it must determine what concepts are implied by the user. In case of synonyms, these weights also permit associating a cost with each possible interpretation. Thus, only one statement will finally be retained by the comprehension module-the lowest-priced one.

To facilitate the semantic completion it is also possible to specify that some concept-relation or concept-concept couples are implicit. If only one of the concepts has been evoked and even though the statement studied is related, the corresponding relation will be added because it is implied in an almost certain manner.

For example, in an application providing the progress of the stock market, the statement "I would like CAC 40" will be completed in an implicit manner by "I would like the progress of CAC 40."

On the other hand, the comprehension module 150 must take into account the context of the user's statement.

For that, it has available the concepts previously evoked at the time by the user and by the agent itself in its answers to the user. A part of these can be used therefore at the time of the completion procedure.

There again, it will be indicated for all relations of the semantic network, whether it is pertinent to keep them in context.

The comprehension module 150 does not use a syntactic or grammatical analyzer. This allows it to correctly interpret syntactically incorrect statements, which is particularly important in an oral dialogue context (and for voice recognition usage), since the syntax of spontaneous speech is much freer, Moreover, since the analysis is made by small syntactic components, it is not necessary to construct a grammar that is going to try to predict in advance the set of possible statements by the users.

Finally, the sole part dependent upon the user's language is the table joining the users vocabulary to the concepts of the semantic network.

The semantic data of the network represent in effect universal notions. This point particularly facilitates the transfer of one application from one language to another language.

The generation module 160 accomplishes the inverse task of the comprehension module. It is capable of transcribing a sequence of communicative acts produced by the rational unit 100 into a statement in the user's natural language.

The generation procedure operates in two phases.

The first phase consists in making all decisions for the linguistic choice offered in order to verbalize the communicative act sequence provided in the input module.

For that the generator 160 uses the dialogue context among other elements to construct the statement most suited to the current situation.

Thus, in an appointment application, the module 160 should make a customized choice between equivalent formulations such as "Jean's telephone number is," "Jean's number is," or "his number is," "it is . . . " according to the dialogue context.

The objective of this first phase is to construct an intermediate representation of the statement by using a notion of abstract linguistic resources 133. An abstract linguistic resource represents either a lexical resource 135, for example the common names, verbs, adjectives, or a grammatical resource, that is to say the syntactic structure.

The second phase uses this abstract representation to construct the definitive statement.

It concerns a processing stage that only requires the strict application of grammar rules. Among these phenomena are found, for example, the determination of the order of the statement's constituents, the agreement between these constituent and the verbs declinations.

Comprehension 150 and generation 160 modules use as their input format respectively the output, of the written texts.

If a vocal interaction is desired with a rational agent, it is necessary to attach to it the speech recognition and synthesis modules.

The recognition module 170 records the user's vocal signal in a text corresponding to the pronounced statement. This module 170 is essential for example when a rational agent is used as a telephone server: then the only possible interaction is vocal.

The rational unit including the semantic network that models the data that this latter manipulates, together form the kernel of a software agent.

As such, this agent can communicate through the network for example with other software agents.

The ACL communication primitive defined by the rational interaction theory constitutes a communication language between agents that allow them to realize unambiguous interaction.

Figure 4:
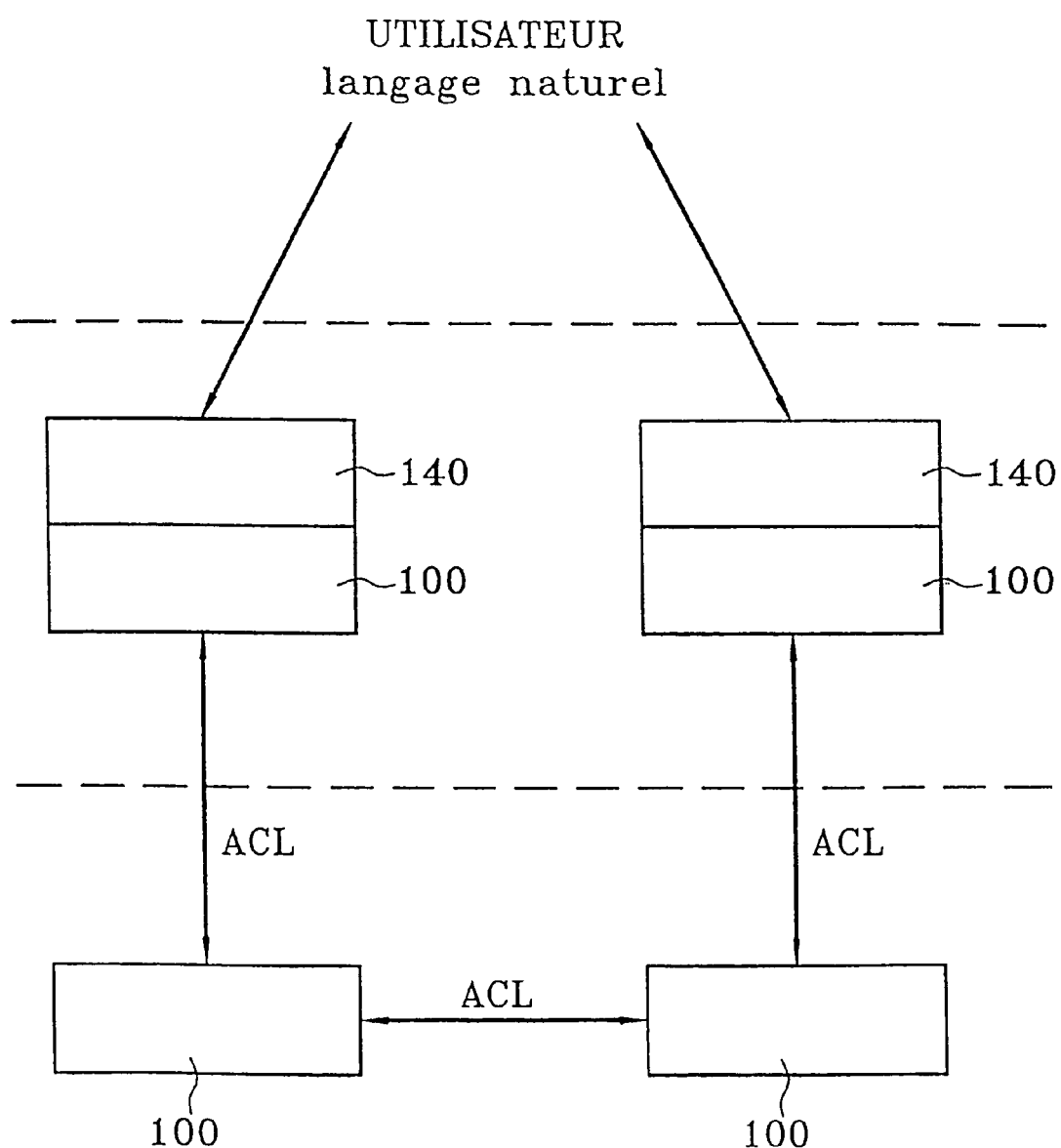
FIG. 4 represents an architecture showing a conversational rational agent as the kernel of a multiagent system.

The agents formed by a rational unit 100 and their semantic network 120 without their interaction components in a natural language (modules 140 and 150) are particularly well suited to the use of the ACL communication language between software agents to form multiagent systems as represented in FIG. 4.

The invention has been implemented with a SUN Ultra1 workstation (provided with a 166 Megahertz processor) and a SUN Ultra2 work station (possessing two 64 bit processors and clock frequency of 300 Megahertz).

Active memory is used where the size can be around 32 Megabytes minimum. The maximum response time of the system is 2 seconds on the Ultra2 platform and 5 seconds on the Ultra1. The connection with a digital network can be made by means of a integrated digital services network interface card IDSN-Basic Rate Interface.

The three modules that have been described, the comprehension 150, the generation 160 and the rational unit 100 were implemented in Prolog (Quintus version 3.3 for Solaris 2.5). The communication between the different modules and speech recognition and synthesis systems is performed by a program written in "C" language, a prototype of the invention has been developed under Solaris, but a version not including speech recognition and synthesis modules has been executed under WINDOWS NT 4.0.

Elements of the Logical Formalization Framework: Formal Specifications

The concepts of mental attitudes (belief, uncertainty, intention) and action that are manipulated here are formalized within the framework of a modal logic of the first order (cf. the publication: Sadek 91a, 92, for details of this logic). The aspects of the formalism are introduced briefly, which are used in the exposition that follows. In the following, the symbols -, ^, V, and ⇒ represent the classic logical connectors of negation, conjunction, disjunction and implication, and ∀ and ∃, the universal and existence quantifiers; p represents a close formula (denoting a proposition), ψ, and δ the formula schemes, and i and j (sometimes h) the schematic variables denoting agents. It is noted that $\models\phi$ indicates the fact that the formula φ is valid.

The mental attitudes considered as semantically primitive, namely belief, uncertainty and choice (or preference) are formalized respectively by the modal operator K, U and C. Formulae such as K(i p), U(i,p), and C(i,p) can be read respectively as "i believes (or thinks that) p (is true)", "i is uncertain of (the truth of) p" and "i wants p to be actually true." The logical model adopted for the operator K takes into account of the interesting properties for a rational agent, such as consistencies of its beliefs or its capacity for introspection formally characterized by the validity of logical schemes such as $K(i,\phi) \Rightarrow \neg K(i,\neg\phi)$,
$K(i,\phi) \Rightarrow K(i, K(i,\phi))$, and
$\neg K(i,\phi) \Rightarrow K(i,\neg K(i,\phi))$.

For the uncertainty, the logical models also guarantee the validity of desirable properties such as, for example, the fact that an agent cannot be uncertain of its own mental attitudes ($\models \neg U(i, M(i,\phi))$, where M belongs to (K,$\neg$K, C,$\neg$C, U,$\neg$U etc.)). The logical models for the choice causes properties such as the fact that an agent "assumes" the logical consequences of its choices.

$(\models (C(i,\phi) \wedge K(i,\Rightarrow\psi)) \Rightarrow C(i,\psi))$, or that an agent cannot not choose the courses of events in which it thinks it finds itself already $(\models K(i,\phi) \Rightarrow C(i,\phi))$.

The attitude of intention that it is not semantically primitive, is formalized by the operator I that is defined (in a complex manner) from operators C and K. A formula such as I(i,p) can be read as "i has the intention to realize p." The definition of the intention imposes on an agent not to seek to attain that which it thinks is not already attained ($\models (I(i,\phi) \Rightarrow K(i,\phi))$, and guarantees the fact that an agent does not have the intention of carrying out effects outside of its intentions (thus "to have the intention to connect to a network and to know that it can contribute to cluttering it, does not imply (necessarily!) to have the intention of contributing to clutter the network").

In order to permit the reasoning on the action, event sequences are included, in addition to individual objects and agents. The language contains terms (in particular variables e, $e_1$, . . . ) that run through the set of these sequences. A sequence can be formed from only one event (that can be an empty (null) event). In order to be able to speak of complex plans, the events (or sequences—$\alpha_1$: $\alpha_2$, or non deterministic choices $\alpha a_1|\alpha a_2$; the schematic variables, $\alpha$, $\alpha_1$ $\alpha_2$ . . . , are used to denote expressions of action. Operators are also introduced Feasible, Done and Agent (i,$\alpha$) such as the formulae Feasible($\alpha$p), Done($\alpha$p) and Agent(i,$\alpha$) signify respectively (the action or the expression of action) a can take place after which p will be true, $\alpha$ has just taken place before which p was true, and i denotes the unique agent of events appearing in $\alpha$.

A fundamental property of the logic proposed is that agents modeled are in perfect agreement with themselves with regard to their own mental attitudes. Formally, the scheme $\phi \Leftrightarrow K(i,\phi)$, where $\phi$ is governed by a modal operator formalizing a mental attitude of the agent i, is valid (Sadek 91a, 92).

The following abbreviation are used, where True is the promotional constant always true:

Feasible(a)≡Feasible(a,True)
Done($\alpha$)≡Done(a,True)
Possible($\phi$)≡($\exists$e)Feasible(e,$\phi$)
KIf(I,$\phi$)≡K(i,$\phi$)∨K(i,$\neg\phi$)

Kref(i,lx δ(x))≡(∃y)K(i.lx δ(x)=y): the agent i knows the (or the objects that is one) δ, where l is the description operator defined as (producer of terms) such that:*

$$\phi(lx\ \delta(x))\equiv\exists y\phi(y)\hat{}\delta(y)\hat{}\forall z(\delta(z)\Rightarrow z=y)$$
$$Uref(i,lx\ \delta(x))\equiv(\exists y)U(i,lx\ \delta(x)=y)$$

Rationality Principles and Action Model

Two rationality principles establish the link between an agent's intentions and its plans and actions (Sadek 91a, 91b), The first principle stipulates that an agent cannot have the intention of realizing a given proposition without by itself having the intention that is formed by one of the actions that it thinks it has for the purposes of the proposition in question, and for which there is no particular objection that it be done. Formally, it is expressed by the validity of the following scheme:

$$I(I,p)\Rightarrow I(Done(a_1|\ldots|a_n))$$

where $a_k$ are all actions such as:
  p is the rational effect of $a_k$ (i.e. the reason for which $a_k$ is planned);
  the agent i recognizes the action $a_k$: Kref(i,$a_k$)
  ¬C(i,¬Possible(Done($a_k$)))

The second principle stipulates that an agent that has the intention a given action be done, necessarily adopts the intention that this action is feasible, if it does not think so already; which is expressed formally by the validity of the following scheme:

$$I(i,\ Done(a_k))\Rightarrow K(i,\ Feasible(a_k)\vee I(i,K(i,Feasible(a_k)))$$

The solution to the problem of the effect of an action is linked directly to the expression itself of rationality principles. We consider that if one cannot predict the actual effects of an action, we can however say (in a valid form) what we expect from the action, otherwise stated, the reason for which it is selected. This is in fact what is expressed by the first rationality principle above. These semantics of the effect of an action, within the scope of the rational behavior model, permit us to ignore the problem of non-predictability of the effect.

By way of example here is a simplified model (for which it is the expression of the pre-conditions) of the communicative act to inform on the truth of a proposition:

<i,Inform(j, φ)>
  Precondition: K(i,φ)^¬K(i, K(j,φ))
  Effect: K(j, φ)

This model is directly axiomatized within the logical theory through the above principles of rationality, and the following scheme (thus actions are not pairs manipulated by a scheduling procedure like data structures are, such as is done is in the framework of the classic guided plan approach, but have a logical semantism within the theory itself):

K(h, Feasible(<i, Inform(j, φ)⇔¬K(i, φ)^K(i, K(j, φ)))

Let us note that the two above principles by themselves specify (without any extra-logical artifice) a scheduling algorithm, which deductively produces action plans by inference of causal chains of intent.

Formalization of Some Principles of Cooperative Behavior

You can refer to (Sadek 91a, 94a) for a detailed proposition of a model of the cooperative behavior within a formal theory of rational interaction.

The Adoption of Intention or the Minimal Principle of Cooperation

A priori, nothing on the strictly rational plan constrains an agent to be (either largely or slightly) cooperative and, in particular, to react to prompts from others (such as for example, to respond to questions that are put to it). This limiting condition, which we call the minimum principle of cooperation, is a particular case of the following property of adoption of intent: If an agent i thinks that an agent j has the intention to realize a property p, and said agent itself does not have the opposite intent, then i is going to adopt the intention that j may know (one day) that p is realized. This property translates formally into the validity of the following formula scheme:

K(i,I(j,p))^¬I(i, ¬p))⇒I(i, K(j,p))

Together, the two previous properties guarantee that an agent is going to act sincerely, and therefore to cooperate. Otherwise, it is important to underline that they express a lot more than a principle of minimal cooperation. In fact, they expresses a principle of "quite brief" cooperation. They translate the fact that from the moment an agent learns of the objectives of another agent, then it will help the other to attain them, insofar as they do not contradict its own objectives.

The Relevance

Most of the remarkable types of cooperative responses are manifest by the communication of supplemental of information with regard to what has been explicitly requested. However, the amount of additional information depends heavily on the presumed interest of the party requesting this information, and in particular, of its acknowledged intentions. The notion of interest is very contextual and remains rather tricky to establish in the general case. On the contrary, it is information, obviously, that are not pertinent to the interlocutor, those for example, (presuppositions) already known about him. Stated otherwise, the avoidance of redundancy is a component of cooperative behavior, which can be expressed as follows, in terms of the elementary property (that, actually, is not primitive but derives directly from the same definition of the concept of intention): if an agent has the intent to make known to an agent j a proposition p then i must think that j does not already know it. Formally it translates from the validity of the following scheme:

I(i, K(j,p))⇒K(I, ¬K(j, p))

The Adjustment of Beliefs

A corrective response is generated with the intention to correct the interlocutor's belief, judged as erroneous. This belief generally constitutes a presupposition inferred (by implication (Grice 75)) from the recognized communicative act. The intention in question is generated at an agent's location every time that its belief about a proposition regarding which it does not believe its interlocutor competent, is found to be in contradiction with that of its interlocutor. It translates formally in the validity of the following scheme:

K(i,(p^K(j, ¬p))⇒I(i, K(j,p))

Reaction to Prompts

In a communicating system an agent cannot resolve the non recognition by a phenomenon that it has observed.

To give an account of this feature, the following dual property is formulated: the first choice of this property stipulates that after a phenomenon that an agent perceives and with which, either it cannot associate an intelligible event, or any event that it can associate is unacceptable in view of its beliefs, the agent is going to adopt the intention to learn what has taken place, typically by generating a request for repetition. The second choice of this property, which is less general than the first, only concern the case where the agent cannot, according to its mental state, accept any feasible event whatsoever from what he observed; in this case the agent is going to adopt the intention to make known its disapproval to the author of the event with regard to the fact "understood," which, in terms of linguistic statement, can be manifest for example by the enunciation of the fact that the agent is forbidden to admit the act in point.

Formally, the two choices of this property are expressed by the validity of the two following schemes, the predicates Observe (i,o) and Realize(o,e) signify respectively that agent i has just observed the observable entity o (such as a statement, for example), and that the observable entity o is a way to realize the event e:

(i) $(\exists e)$ Done(e)^$\neg$Kref(i, Done($e_1$))$\Rightarrow$I(i,Kref(i, Done($e_2$))

(ii) $(\forall o)(\forall e)$ [Observe(i, o) and Realize(o, e)^Agent(j,e) and $\neg$Kref(i, Done($e_1$))$\Rightarrow$I(i, K(j,$\neg$K(i, Done(e))))

Harmony with Others

An agent's behavior in a cooperative multiagent universe must appear, in its main components, as a generalization of its behavior with regard to itself. (For example, it must be valid that an agent is sincere, coherent and "cooperative" with itself.) Also an agent must not cause in any way the other agents to lose information. In particular, it must not seek uncertainty for others as an end in itself, except, possibly, if it thinks that it is a "sound" attitude to adopt with regard to a given proposition: that supposes it has already adopted this attitude itself. In order to give account of this behavior the following property is proposed:

(i) C(i,Possible(U(j,$\phi$)))$\Rightarrow\Gamma_1$ where $\Gamma_1$ can, for example, give account of the fact that the choice for another agent of the future where a proposition is uncertain, only imposes this future as a transient stage toward a learning situation. Formally $\Gamma_1$ can be:

C(i,$(\forall e)$(Feasible(e,U(j,p))$\Rightarrow(\exists e')$ Feasible(e;e', Kif(j,p))) $\vee$U(i,p)

A similar property can be posed with regard to the search for ignorance by others. For example, an agent i that wants an agent j not to believe anymore (viz: is no longer uncertain of) a given proposition p, must itself believe (viz: not be uncertain of) p and wish j to adopt the same attitude as itself regarding p. The following property is then proposed:

(i) C(i,Possible($\neg$K(j,$\phi$)))$\Rightarrow\Gamma_2$ (i) C(i,Possible($\neg$U(j,$\phi$)))$\Rightarrow\Gamma_3$ where conditions $\Gamma_2$ and $\Gamma_3$ will have a similar form to conditions $r_1$ (the proposed schemes (i), (ii) and (iii) remain valid if the operator of choice C is replaced by the operator of intention I). We leave these conditions incompletely specified voluntarily, because their precise expression depends therefore on the manner in which the modeled agent is desired to behave. They can, for example, quite simply be reduced to the propositional constant False. Whatever it may be, they do not have an impact on the remainder of the theory.

According to what one chooses to put in conditions $\Gamma_k$ one can validate schemes such as:

$\neg$I(i, $\neg$Kif(j,$\phi$)),$\neg$I(i,$\neg$Kref(j,lx$\phi$(x))), I(i, $\neg$Uif(j,$\phi$))$\Rightarrow$I(i, Kif(j,$\phi$)), or I(i, $\neg$Uref(j,$\phi$(x)))$\Rightarrow$I(i, Kref(j,lx$\phi$(x)))

The Logical Access to the "Black Boxes" of the Domain Constraint Management

The "black box" functions of the domain constraint management: relaxation, restriction, surplus-information, is directly "accessible" from the logical framework formalizing the behavior of the rational agent (see (Bretier 95)), Under an illustrative heading "the access" to the procedure of surplus-information is made through the following scheme, where SURINF is a meta-predicate:

K(i,I(i,K(j,p)))^SURINF(p,q))$\Rightarrow$I(i, K(j,q)))

This scheme expresses the following property: if an agent i has the intention that an agent j believes a proposition p and that i thinks (by its surplus-information function) that the proposition q can be a surplus-information pertinent to p, then i will adopt the intention that j also comes to believe the proposition q.

The invention claimed is:

1. A method of dialogue between a user and a software agent operating on a server, the software agent including a rational unit, said method comprising:
   receiving, by the software agent, statements in natural language originating from the user;
   interpreting the statements in a logical statement that acts as input to the rational unit;
   determining the existence of at least one behavioral principle applying to the logical statement among a set of predetermined principles;
   deducing one or more logical consequences as a function of the at least one behavioral principle;
   determining communication actions to be made corresponding to the deduced logical consequences, the communication actions being output from the rational unit;
   transcribing the communication actions in a statement in natural language; and
   sending the transcribed statement to the user,
   wherein the logical statement at input to the rational unit and the communication actions at output of the rational unit are formalized in a communication language utilized as a communication language between software agents.

2. The method according to claim 1, wherein the communication language utilized as communication language between software agents is an ACL type language.

3. The method according to claim 1, wherein determining the existence of at least one behavioral principle further comprises:
   verifying that the logical statement corresponds to a predefined axiom scheme and forms part of a set of data in the rational unit, the axiom scheme coding the behavioral principles.

4. The method according to claim 3, further comprising:
   predetermining the axiom scheme and entering the predetermined axiom scheme into the rational unit declaratively as a function of a task to be carried out by the software agent.

5. The method according to claim 1, wherein interpreting the statements further comprises:
   in a first stage, determining concepts from the statement in a first stage; and
   in a semantic completion stage, utilizing a semantic network connecting the concepts to one another, the semantic network being predefined and constituting a knowledge base.

6. The method according to claim 5, wherein interpreting the statements further comprises:
   in a weighting stage in the semantic completion stage, fixing a weight to each relation of the semantic network according to a notion of conceptual probability.

7. The method according to claim 5, further comprising:
   in a creation stage, creating at least one of new concepts and new relations between concepts enriching the semantic network.

8. The method according to claim 1, wherein interpreting the statements further comprises:
   taking into account the context of the statement.

9. A dialogue system between a user and software agent operating on a server, comprising:
- a comprehension module adapted to receive statements in natural language and interpret the statements in a logical statement;
- a rational unit adapted to receive as input logical statements originating from the comprehension module and suitable for determining the existence of at least one behavioral principle applying to a logical statement among a set of predetermined principles, to deduce one or more logical consequences as a function of the behavioral principles, and to determine communication actions corresponding to the logical deduced consequences; and
- a generation module adapted to transcribe the acts of communication originating from the rational unit in a statement in natural language and send the statement to the user,
- wherein the logical statement at input to the rational unit and the communication actions at output of the rational unit are formalized in a communication language utilized as a communication language between software agents.

10. The dialogue system according to claim 9, wherein the rational unit comprises an inference engine and a set of predetermined data comprising axiom schemes coding the behavioral principles.

11. A method of dialogue between a user and a software agent operating on a server, the software agent including a rational unit, said method comprising:
- receiving, by the software agent, statements in natural language originating from the user, wherein the statements include semantic content;
- interpreting the statements in a logical statement that acts as input to the rational unit;
- determining the existence of at least one behavioral principle applying to the logical statement among a set of predetermined principles;
- deducing one or more logical consequences as a function of the at least one behavioral principle, the consequences reflecting the semantic content of the statements originating from the user;
- determining communication actions to be made corresponding to the deduced logical consequences, the communication actions governing semantic content of a response to the statements originating from the user and being output from the rational unit;
- transcribing the communication actions in a statement in natural language; and
- sending the transcribed statement to the user,
- wherein the logical statement at input to the rational unit and the communication actions at output of the rational unit are formalized in a communication language utilized as a communication language between software agents.

12. The method according to claim 11, wherein the communication language utilized as communication language between software agents is an ACL type language.

13. The method according to claim 11, wherein determining the existence of at least one behavioral principle further comprises:
- verifying that the logical statement corresponds to a predefined axiom scheme and forms part of a set of data in the rational unit, the axiom scheme coding the behavioral principles.

14. The method according to claim 13, further comprising:
- predetermining the axiom scheme and entering the predetermined axiom scheme into the rational unit declaratively as a function of a task to be carried out by the software agent.

15. The method according to claim 11, wherein interpreting the statements further comprises:
- in a first stage, determining concepts from the statement in a first stage; and
- in a semantic completion stage, utilizing a semantic network connecting the concepts to one another, the semantic network being predefined and constituting a knowledge base.

16. The method according to claim 15, wherein interpreting the statements further comprises:
- in a weighting stage in the semantic completion stage, fixing a weight to each relation of the semantic network according to a notion of conceptual probability.

17. The method according to claim 15, further comprising:
- in a creation stage, creating at least one of new concepts and new relations between concepts enriching the semantic network.

18. The method according to claim 11, wherein interpreting the statements further comprises:
- taking into account the context of the statement.

* * * * *